US012568970B2

(12) United States Patent
Le et al.

(10) Patent No.: US 12,568,970 B2
(45) Date of Patent: Mar. 10, 2026

(54) STABILITY INSECTICIDAL COMPOSITIONS AND METHODS OF MAKING AND USING THE SAME

(71) Applicant: BASF Corporation, Florham Park, NJ (US)

(72) Inventors: Duy Minh Le, Cary, NC (US); Philip M Mathew, Morrisville, NC (US)

(73) Assignee: BASF Corporation, Florham Park, NJ (US)

( * ) Notice: Subject to any disclaimer, the term of this patent is extended or adjusted under 35 U.S.C. 154(b) by 820 days.

(21) Appl. No.: 17/784,554

(22) PCT Filed: Dec. 14, 2020

(86) PCT No.: PCT/US2020/064883
§ 371 (c)(1),
(2) Date: Jun. 10, 2022

(87) PCT Pub. No.: WO2021/119597
PCT Pub. Date: Jun. 17, 2021

(65) Prior Publication Data

US 2023/0030621 A1 Feb. 2, 2023

Related U.S. Application Data

(60) Provisional application No. 62/947,377, filed on Dec. 12, 2019.

(51) Int. Cl.
*A01N 43/78* (2006.01)
*A01N 25/02* (2006.01)
*A01N 25/30* (2006.01)
*A01N 43/50* (2006.01)

(52) U.S. Cl.
CPC ............ *A01N 43/78* (2013.01); *A01N 25/02* (2013.01); *A01N 25/30* (2013.01); *A01N 43/50* (2013.01)

(58) Field of Classification Search
CPC ...................................................... A01N 43/78
See application file for complete search history.

(56) References Cited

U.S. PATENT DOCUMENTS 6,086,923 A * 7/2000 Stoller .................. A01N 47/28
424/722
2016/0355445 A1* 12/2016 Bobeck .................. A01N 63/22
2021/0161140 A1* 6/2021 Peris ...................... A01N 47/06

FOREIGN PATENT DOCUMENTS

WO WO-2019197637 A1 * 10/2019 ............. A01N 25/04

* cited by examiner

*Primary Examiner* — Svetlana M Ivanova
(74) *Attorney, Agent, or Firm* — Richa Dhindsa; BASF Global Intellectual Property

(57) ABSTRACT

The disclosure provides for agrochemical formulations capable of carrying high active ingredient loads and having improved stability. The disclosure further provides for methods of making and using high-load agrochemical formulations having improved stability.

19 Claims, 8 Drawing Sheets

| Formulation | Loading (g/L) | Viscosity (cP, 20 1/s) | Yield Stress (Pa) |
|---|---|---|---|
| Exemplary Composition 1 | 750 | 330 | 6.2 |
| Commercial Standard | 600 | 342 | 3.5 |

STABILITY INSECTICIDAL COMPOSITIONS AND METHODS OF MAKING AND USING THE SAME

CROSS-REFERENCE TO RELATED APPLICATIONS

This application is a National Stage Entry of PCT/US2020/064883, filed Dec. 14, 2020, which claims benefit of U.S. Provisional Application No. 62/947,377, filed Dec. 12, 2019, the disclosures of each of which are hereby incorporated by reference in their entirety.

FIELD

The disclosure provides for agrochemical formulations capable of carrying high active ingredient loads and having improved stability. In another aspect, the disclosure provides for methods of making and using high-load agrochemical formulations having improved stability.

BACKGROUND

There is an ongoing need for agrochemical formulations that are more efficient and cost-effective.

By increasing the load of active agricultural ingredients in a formulation, application rates may be reduced, thereby streamlining application of agricultural chemicals to crops.

However, high-load formulations generally exhibit high accumulation rates of solids, which can lead to viscous mixtures that are difficult to mix, pump, or otherwise apply or distribute. Additionally, heat generation during milling is of concern for high-load agricultural formulations.

Long-term stability of high-load formulations is also a concern, generally. For example, high-load formulations are prone to sedimentation and syneresis or flocculation (i.e., the process of contact and adhesion whereby the particles of a dispersion form larger-size clusters). Suspension stabilization, such as stabilization of agrochemical compositions, is largely driven by polymer overlap and entropic loss. If the physical stability of a formulation is inadequate this can lead to the formation of hard packed or dilatant sedimentation layers that can be difficult to resuspend, making the product unusable for the end user.

In general, seed treatment formulations require a balance of properties, in particular there needs to be a balance between rheological structure which prevents sedimentation and viscosity which allows the product to be dispensed under moderate shear conditions.

Rheological measurements have been correlated with sedimentation and phase separation phenomena, and in particular yield stress is an excellent measure of rheological gel structure and sedimentation behavior. Yield stress is the amount of stress at which point a suspension experiences fluid-like behavior. Suspensions with increased yield stress resist sedimentation and thus, are more stable to sedimentation. See, for example, M. A. Faers, G. R. Kneebone, Pestic. Sci. 1999, 55, 312; see M. A. Faers, T. H. Choudhury, B. Lau, K. McAllister, P. F. Luckham, Colloids and Surfaces A: Physiochem. Eng. Aspects 2006, 288, 170; see J. L. Burns, Y. Yan, G. J. Jameson, S. Biggs, Colloids and Surfaces A: Physiochem. Eng. Aspects 2003, 214, 173; see Y. Yan, J. L. Burns, G. J. Jameson, S. Biggs, Chem. Eng. J. 2000, 80, 23; see M. A. Faers, Adv. Coll. Int. Sci. 2003, 106, 23.

The present inventors have found that formulations described herein not only achieve a high active ingredient load, but they also exhibit improved yield stress and thus improved stability.

SUMMARY

The inventors of the present disclosure discovered it is possible to provide a stable, low-viscosity seed treatment suspension formulation comprising a high active ingredient load by adding glycol and/or glycerin to the formulation. In particular, the seed treatment suspension formulations of the invention exhibit a yield stress greater than that achievable by addition of conventional surfactants and xanthan gum. In some embodiments, the yield stress necessary to prevent sedimentation can be achieved at a lower viscosity. The inventors surprisingly found that glycols, such as propylene glycol, were highly effective in increasing yield stress while maintaining low viscosity in formulations containing high loads of active ingredients, such as neonicotinic pesticides. The inventors also surprisingly found the formulations described herein have a significantly lower syneresis compared to commercially available formulations over time (e.g., 1 year).

In some embodiments, the disclosure provides a seed treatment suspension formulation comprising a high load of active ingredient and a glycol and/or glycerin, wherein the seed treatment suspension formulation exhibits a yield stress greater than that achievable by addition of conventional surfactants and xanthan gum. In some embodiments, the yield stress necessary to prevent sedimentation can be achieved at a lower viscosity.

In some embodiments, the active ingredient is a pesticide, such as a neonicotinoid. In some embodiments, the neonicotinoid is selected from clothianidin and/or imidacloprid.

In some embodiments, the disclosure provides a seed treatment suspension formulation comprising:

(a) clothianidin present in a concentration of at least about 650 g/L; and
(b) a glycol and/or glycerin;
wherein said seed treatment suspension formulation exhibits a yield stress equal to or greater than a formulation comprising less glycol or glycerin.

The disclosure further provides a seed treatment suspension formulation comprising:

(a) clothianidin present in a concentration of at least about 650 g/L;
(b) a glycol; and
(c) glycerin;
wherein said seed treatment suspension formulation exhibits a yield stress equal to or greater than a formulation comprising less glycol or glycerin.

The disclosure further provides a seed treatment suspension formulation comprising:

(a) clothianidin present in a concentration of at least about 650 g/L;
(b) a glycol; and
(c) at least one salt;
wherein said seed treatment suspension formulation exhibits a yield stress equal to or greater than a formulation comprising less glycol or glycerin.

The disclosure further provides a seed treatment suspension formulation comprising:

(a) clothianidin present in a concentration of at least about 650 g/L;
(b) a glycol; and
(d) silica;

wherein said seed treatment suspension formulation exhibits a yield stress equal to or greater than a formulation comprising less glycol or glycerin.

The disclosure further provides a seed treatment suspension formulation comprising:

(a) clothianidin present in a concentration of at least about 650 g/L;

(b) a glycol;

(c) glycerin;

(d) at least one salt; and (e) silica;

wherein said seed treatment suspension formulation exhibits a yield stress equal to or greater than a formulation comprising less glycol or glycerin.

The disclosure further provides for a method of producing an agrochemical formulation comprising:

(a) in a first step, combining at least one insecticidal agent and at least one antifreeze agent; and (b) in a second step, adding to the at least one insecticidal agent and the at least one antifreeze agent a mixture comprising xanthan gum and at least one antifreeze agent.

The disclosure further provides for a method of increasing yield stress of an agricultural formulation, such as a seed treatment suspension, comprising adding a glycol, xanthan gum and/or glycerin to the seed treatment suspension formulation.

The disclosure further provides for a method of controlling insect pests comprising applying to a plant, plant part, seed, or habitat in which a plant is growing or to be grown a formulation comprising:

(a) at least one insecticidal agent;

(b) at least one antifreeze agent.

The disclosure also provides for seeds or plants or plant parts treated with compositions described herein.

BRIEF DESCRIPTION OF THE DRAWINGS

FIG. 5 illustrates that xanthan gum is actually the least efficient means to increase physical stability, contrary to popular practice.

FIG. 6A also depicts the synergy between glycerin and propylene glycol. The combination of both glycerin and propylene glycol achieves a higher than expected yield stress, which is derived from the addition of propylene glycol, but over time the yield stress also grows, which is derived from the addition of glycerin.

FIG. 6B depicts that addition of glycerin does not result in a concurrent increase in viscosity both in the case of glycerin alone and in combination with propylene glycol. Yield stress and viscosity typically increase simultaneously, yet it has been found by the inventors that, by adding glycerin, yield stress builds over time without affecting viscosity.

DETAILED DESCRIPTION

Figure 1:
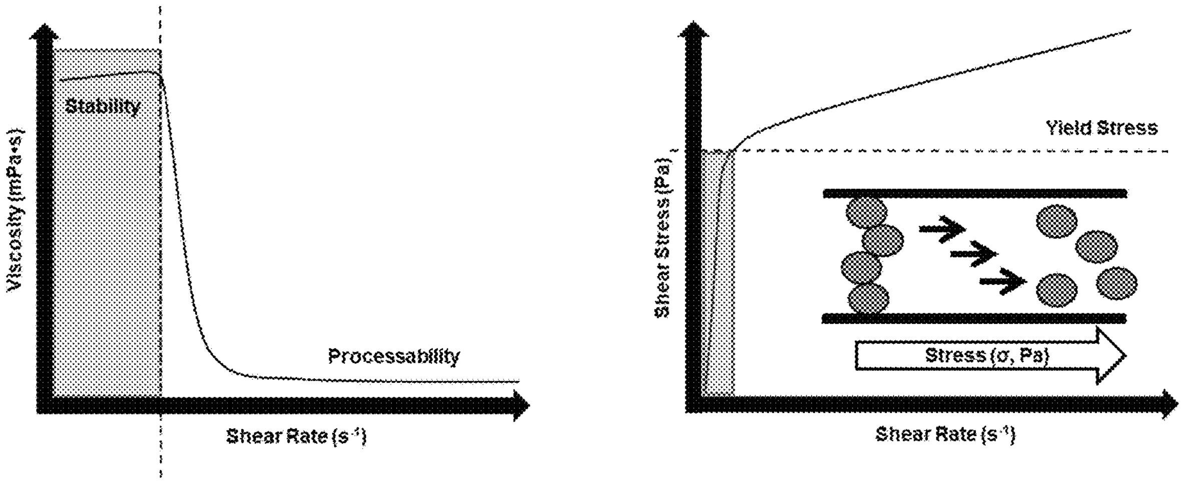
FIG. 1 depicts the relationships between viscosity and shear rate (left), and stress and shear rate (right).

The inventors of the present disclosure found that glycols, such as propylene glycol, and/or glycerin were highly effective in increasing yield stress while maintaining low viscosity in formulations containing high loads of active ingredients, such as neonicotinic pesticides. The inventors also unexpectedly found the formulations described herein have a significantly lower syneresis compared to commercially available formulations over time (e.g., 1 year). This is particularly surprising since highly loaded formulations are more prone to sedimentation and syneresis due to the higher solids content.

In some embodiments, the disclosure provides a seed treatment suspension formulation comprising a high load of an active ingredient and a glycol, wherein the seed treatment suspension formulation exhibits a yield stress equal to or greater than the yield stress of a formulation comprising less glycol and/or glycerin. In another embodiments, the disclosure provides a seed treatment suspension formulation comprising a high load of an active ingredient and a glycol, wherein the seed treatment suspension formulation exhibits a yield stress equal to or greater than the yield stress of a formulation without glycol and/or glycerin. In some embodiments, the seed treatment suspension formulation of the invention exhibits low viscosity (i.e., viscosity of the formulations is low enough to enable application of the formulation to seed using conventional means).

In an aspect, a seed treatment suspension formulation according to the present invention, the active ingredient can include at least one of any desired or known pesticide. In another aspect, the at least one pesticide is an insecticide, fungicide, herbicide, miticide, bactericide and/or microbicide.

In another aspect, the seed treatment suspension formulation of the invention includes one or more insecticidal active ingredients selected from the group consisting of acetamiprid, clothianidin, dinotefuran, imidacloprid, nitenpyram, nithiazine, thiacloprid, thiamethoxam, ethiprole, fipronil, spiromesifen, beta-cyfluthrin, spirodiclofen, flubendiamide, thiodicarb, spirotetramat and a combination of clothianidin and a species of *Bacillus* and/or a product thereof.

In some embodiments, the species of *Bacillus* is selected from the group consisting of *Bacillus firmus, Bacillus cereus, Bacillus pumilis, Bacillus amyloliquefaciens, Bacillus subtilis, Bacillus simplex, Bacillus thuringiensis, Bacillus pumilus, Bacillus subtilis* strain GB03, *Bacillus subtilis* strain QST713.

In certain embodiments, the seed treatment suspension formulation of the invention comprises *Bacillus firmus*.

In certain embodiments, the species of *Bacillus* or product thereof is present at a concentration of 10 to $10^{13}$ cfu/mL, or $10^2$ to $10^{12}$ cfu/mL, or $10^3$ to $10^{11}$ cfu/mL, or $10^4$ to $10^{10}$ cfu/mL In certain embodiments, the at least one insecticidal active ingredient is one or more neonicotinoid.

In certain embodiments, the at least one insecticidal active ingredient is selected from acetamiprid, clothianidin, imidacloprid, nitenpyram, nithiazine, thiacloprid, thiamethoxam, or a combination thereof.

In certain embodiments, the at least one insecticidal active ingredient is present in the formulation at a concentration of over 600 g/L, at least about 625 g/L at least about 650 g/L, or of at least about 700 g/L, or of at least about 725 g/L, or of at least about 750 g/L.

In certain embodiments comprising two or more insecticidal agents, the insecticidal agents are present in the formulation at a combined (i.e., total) concentration of at least about 650 g/L, or of at least about 700 g/L, or of at least about 725 g/L, or of at least about 750 g/L. In an aspect, a first insecticidal agent may be present in an amount from about 1 g/L to about 250 g/L with the second or more insecticidal agent making up the difference, such that the total formulation comprises at least about 750 g/L, at least about 800 g/L, or at least about 900 g/L of insecticidal actives.

In certain embodiments, the at least one insecticidal active ingredient is present in the formulation at a concentration of about 650 g/L to about 1200 g/L, or about 700 g/L to about 1000 g/L, or about 725 g/L to about 900 g/L, or about 750 g/L to about 850 g/L.

In certain embodiments, the at least one insecticidal active ingredient is present in the formulation at a concentration of at least 50 w/w %, or at least 55 w/w %, or at least 60 w/w %, or at least 65 w/w %, or at least 70 w/w %. In certain embodiments, the at least insecticidal active ingredient is present in the formulation at a concentration of from about 50 w/w % to about 80 w/w %, or about 50 w/w % to about 70 w/w %, or about 50 w/w % to about 60 w/w %, or about 55 w/w % to about 80 w/w %, or about 55 w/w % to about 70 w/w %, or about 55 w/w % to about 65 w/w %, or about 55 w/w % to about 64% w/w %, or about 55 w/w % to about 63 w/w %, or about 55 w/w % to about 62 w/w %, or about 55 w/w % to about 61 w/w %, or about 55 w/w to about 60 w/w %, or about 56 w/w % to about 65%, or about 57 w/w % to about 65 w/w %, or about 58 w/w % to about 65 w/w %, or about 59 w/w % to about 65 w/w %, or about 60 w/w % to about 65 w/w %, or about 56 w/w % to about 60 w/w %, or about 57 w/w % to about 60%, or about 56 w/w % to about 59 w/w %, or about 58 w/w % to about 60.

In certain embodiments, the insecticidal active ingredient is clothianidin:

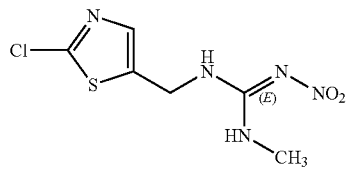

The International Union of Pure and Applied Chemistry (IUPAC) name for clothianidin is 1-(2-Chloro-1,3-thiazol-5-ylmethyl)-3-methyl-2-nitroguanidine.

In some embodiments, the seed treatment suspension formulation comprises:

(a) a neonicotinoid present in a concentration of at least about 700 g/L; and (b) a glycol.

In certain embodiments, the neonicotinoid is selected from clothianidin and/or imidicloprid.

In certain embodiments, the glycol is propylene glycol.

A seed treatment suspension formulation disclosed herein may optionally include one or more additional compounds providing an additional beneficial or otherwise useful effect. Such compounds include, without limitation, an adhesive, a surfactant, a solvent, a wetting agent, an emulsifying agent, a carrier, an adjuvant, a diluent, a dispersing agent, an insecticide, a pesticide, a fungicide, a fertilizer of a micronutrient or macronutrient nature, a herbicide, a feeding inhibitor, an insect molting inhibitor, an insect mating inhibitor, an insect maturation inhibitor, a nematacide, a nutritional or horticultural supplement, or any combination thereof.

In an aspect, a seed treatment suspension formulation according to the present invention may comprise one or more surfactants. In an aspect, any commercially available surfactant may be used. For example, Atlox 4913 is a surfactant provided by CRODA (see crodacropcare.com/en-gb/products-and-applications/product-finder/product/215/Atlox_1_4913), and Pluronic P-105 is a surfactant provided by BASF (see usbio.net/biochemicals/P4283). In certain embodiments, the one or more surfactants are each present in a concentration of from about 0.01 w/w % to about 10 w/w %, or from about 0.1 w/w % to about 7.5%, or from about 0.5% to about 5 w/w %, or from about 2 w/w % to 4 w/w %.

In an aspect, a seed treatment suspension formulation according to the present invention may comprise one or more wetting agents or dispersants. In an aspect, any commercially available wetting agent or dispersant may be used. For example, Morwet D-425 is a wetting agent/dispersant provided by AkzoNobel (see lema.com.mx/presentaciones/agroquimicos/Naph_Sulf_Jun14.pdf), and Soprophor 4d/384 is provided by Solvay Novecare (see solvay.com/en/product/soprophor-4d384). In certain embodiments, the one or more wetting agents are each present in the formulation at a concentration of about 0.01 w/w % to about 1 w/w %, or about 0.05 w/w % to about 0.8 w/w %, or about 0.025 w/w % to about 0.75 w/w %.

In an aspect, a seed treatment suspension formulation according to the present invention may comprise one or more antifoaming agents. In an aspect, any commercially available antifoaming agent may be used. For example, Antifoam 8830 FG is a 30% emulsion of polydimethylsiloxane formulated to control foam in both food and industrial processing, which is diluted with water or process liquids for addition to foam-generating solutions and which is capable of controlling foam over a broad pH range and in nonionic, cationic, and/or anionic systems. Antifoam 8830 FG, for example, is commercially available and provided by Harcros (see harcros.com/product/antifoam-8830-food-grade #).

In an aspect, a seed treatment suspension formulation according to the present invention may comprise one or more biocides. In an aspect, any commercially available biocide may be used. For example, Proxel GXL (20%) provided by Arch chemical (see excelind.co.in/Excel-_Chemical/download/Proxel_GXL_literature.pdf), and Kathon CG/ICP is provided by DuPont (see dupont.com/products/kathoncgicp.html).

In an aspect, a seed treatment suspension formulation according to the present invention may comprise one or more antifreeze agent.

In an aspect, the one or more antifreeze agent may be any glycol. In certain embodiments, the antifreeze agent is propylene glycol.

In certain embodiments, the antifreeze agent is glycerin.

In certain embodiments, the one or more antifreeze agent is a glycol, glycerin, or a combination of one or more glycols and glycerin.

In certain embodiments, one or more glycols are each present in the formulation at a concentration of from about 0.1 w/w % to about 50 w/w %, or from about 0.5 w/w % to about 20 w/w %, about 1 w/w % to about 15 w/w %, or about 3 w/w % to about 10 w/w %.

In certain embodiments, glycerin is present in the formulation at a concentration of from about 0.01 w/w % to about 50 w/w %, or from about 0.1 w/w % to about 30 w/w %, from about 0.5 w/w % to about 25 w/w %, from about 1 w/w % to about 20 w/w %, or from about 3 w/w % to about 15 w/w %.

In certain embodiments, a glycol and glycerin are present in the formulation in a ratio of glycol:glycerin of about 1:15 to about 15:1, or of about 1:10 to about 10:1, or of about 1:7.5 to about 7.5:1, or of about 1:5 to about 5:1. In certain embodiments, a glycol and glycerin are present in the formulation in a ratio of glycol:glycerin of about 1:1.

In an aspect, a seed treatment suspension formulation according to the present invention comprises one or more salts. In an aspect, the one or more salts is one or more chlorides. In some embodiments, the one or more chlorides is selected from sodium chloride, calcium chloride, potassium chloride, magnesium chloride, or any combination thereof.

In certain embodiments, a seed treatment suspension formulation according to the present invention comprises calcium chloride.

In certain embodiments, the one or more salt is present at a concentration of about 0.001 w/w % to about 25 w/w %, or about 0.005 w/w % to about 10 w/w %, or about 0.01 w/w % to about 5 w/w %, or about 0.025 w/w % to about 2.5 w/w %, or about 0.05 w/w % to about 1 w/w %, or about 0.05 w/w % to about 0.5 w/w %, or about 0.075 w/w % to about 0.25 w/w %.

In an aspect, a seed treatment suspension formulation according to the present invention comprises silica.

In certain embodiments, silica is present in the formulation at a concentration of about 0.01 w/w % to about 10 w/w %, or about 0.05 w/w % to about 5 w/w %, or about 0.075 w/w % to about 2.5 w/w %, or about 0.1 w/w % to about 1 w/w %, or about 0.2 w/w % to about 0.75 w/w % or about 0.25 w/w % to about 0.5 w/w %.

The present inventors have found that post-adding xanthan gum in antifreeze (as opposed to water) mitigates drift in viscosity in seed treatment suspension formulations of the present invention over time.

In certain embodiments, xanthan gum is added in an antifreeze solution to a formulation according to the present invention.

In an aspect, any xanthan gum may be used. For example, Rhodopol® 23 is composed of xanthan gum and is commercially available (provided by Solvay Novecare). Additional commercially available xanthan gums include Rhodopol® G, Rodopho 50 MD®, and Rhodicare® T (Rhodopol® and Rhodicare® products are provided by Solvay Novecare), Veegum® (provided by R. T. Vanderbilt, USA), Attaclay® (provided by Engelhard Corp., NJ, USA), Kelzan® and Kelzan® S (Kelzan® products are provided by CP Kelco), and Satiaxane® CX91, Satiaxane® CX91 T, Satiaxane® CX911 DF, Satiaxane® CX930, and Satiaxane® CX 2 QD (Satiaxane® products are provided by Cargill).

In certain embodiments, xanthan gum is present in a concentration of from about 0.01 w/w % to about 10 w/w %, or from about 0.1 w/w % to about 7.5%, or from about 0.5% to about 5 w/w %, or from about 0.1 w/w % to about 1 w/w %, or from about 0.1 w/w % to about 0.5 w/w %, or from about 0.05 w/w % to about 0.2 w/w %, or from about 0.1 w/w % to about 0.3 w/w %.

By way of example, it was determined that seed treatment suspension formulations of the invention comprising 750 g/L clothianidin having a yield stress equal to or greater than the yield stress of a formulation comprising less glycol or glycerin exhibited acceptable stability.

In some aspects, a seed treatment suspension formulation of the invention exhibits a yield stress of at least 5 Pa, or a yield stress of at least 5.5 Pa, or a yield stress of at least 6 Pa, or a yield stress of at least 6.5 Pa, or a yield stress of at least 7 Pa, or a yield stress of at least 8 Pa, or a yield stress of at least 9 Pa, or a yield stress of at least 10 Pa, or a yield stress of at least 12 Pa, or a yield stress of at least 14 Pa, or a yield stress of at least 16 Pa, or a yield stress of at least 18 Pa, or a yield stress of at least 20 Pa. In some aspects, a seed treatment suspension formulation of the invention exhibits a yield stress of from about 5 Pa to about 50 Pa, or from about 5 Pa to about 40 Pa, or from about 5 Pa to about 30 Pa, or from about 5 Pa to about 25 Pa, or from about 5 Pa to about 20 Pa, or from about 5 Pa to about 15 Pa, or from about 5 Pa to about 12 Pa, or from about 5 Pa to about 10 Pa, of from about 5 Pa to about 8 Pa, or from about 6 Pa to about 25 Pa, or from about 6 Pa to about 20 Pa, or from about 6 Pa to about 15 Pa, or from about 6 Pa to about 12 Pa, or from about 6 Pa to about 10 Pa, of from about 6 Pa to about 8 Pa, or from about 6.5 Pa to about 25 Pa, or from about 6.5 Pa to about 20 Pa, or from about 6.5 Pa to about 15 Pa, or from about 6.5 Pa to about 12 Pa, or from about 6.5 Pa to about 10 Pa, of from about 6.5 Pa to about 8 Pa, or from about 7 Pa to about 25 Pa, or from about 7 Pa to about 20 Pa, or from about 7 Pa to about 15 Pa, or from about 7 Pa to about 12 Pa, or from about 7 Pa to about 10 Pa, of from about 7 Pa to about 8 Pa, or from about 10 Pa to about 50 Pa, or from about 10 Pa to about 40 Pa, or from about 10 Pa to about 30 Pa, or from about 10 Pa to about 25 Pa, or from about 10 Pa to about 20 Pa.

The disclosure further provides for methods of making and using seed treatment suspension formulations of the invention.

The disclosure provides herein methods of preparing seed treatment suspension formulations having improved yield stress. In certain embodiments, the method of increasing yield stress of a formulation comprises adding a glycol to the seed treatment formulation. In some embodiments, the glycol is propylene glycol.

In some embodiments, the method of increasing yield stress of a formulation comprises adding a glycol and/or xanthan gum to the seed treatment formulation. In some embodiments, the method of increasing yield stress of a formulation further comprises adding glycerin to the seed treatment formulation.

In an aspect, the method of increasing yield stress of a formulation further comprises adding at least one salt and/or silica to the seed treatment formulation.

In an aspect, seed treatment suspension formulations prepared according to the present invention exhibit yield stress which has been increased by about at least a factor of 2, or by about at least a factor of 3, or by about at least a factor of 5, or by about at least a factor of 7.5, or by about at least a factor of 10.

In an aspect, seed treatment suspension formulations prepared according to the present invention exhibit a yield stress greater than achievable by addition of conventional surfactants and xanthan gum. In some embodiments, the yield stress necessary to prevent sedimentation can be achieved at a lower viscosity.

In an aspect, seed treatment suspension formulations prepared according to the present invention exhibit yield stress of about 0.1 Pa to about 100 Pa, or about 0.5 Pa to about 75 Pa, or about 1 Pa to about 50 Pa, or about 2 Pa to about 25 Pa.

Figure 2:
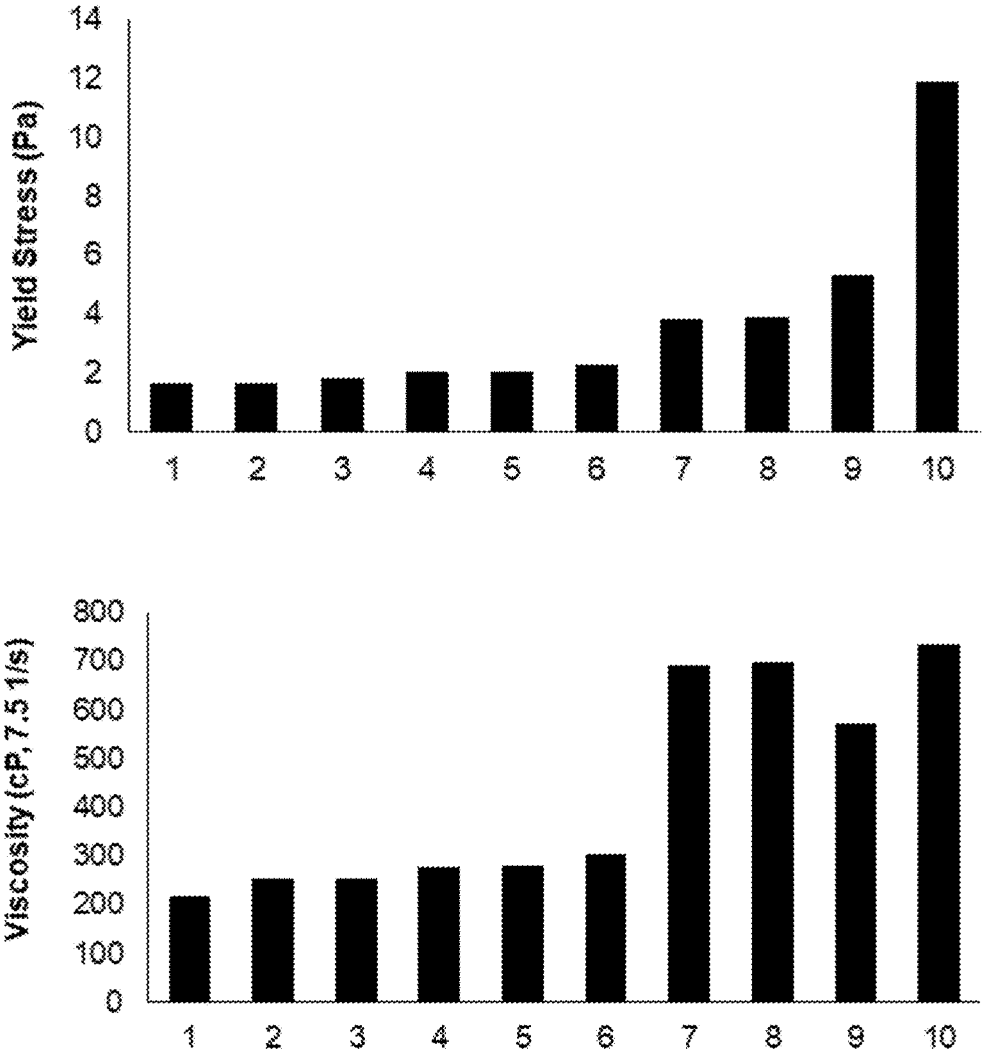
FIG. 2 depicts the results of measuring yield stress (top) and viscosity (bottom) of ten various test formulations. Entry 1 represents a control formulation. Entries 2, 3, 4 and 5 represent formulations having different inorganic rheological modifiers present at a concentration of 0.25 w/w %. Entries 6, 7, 8, 9 and 10 represent formulations having different surfactants present at a concentration of 2 w/w %.
Figure 3:
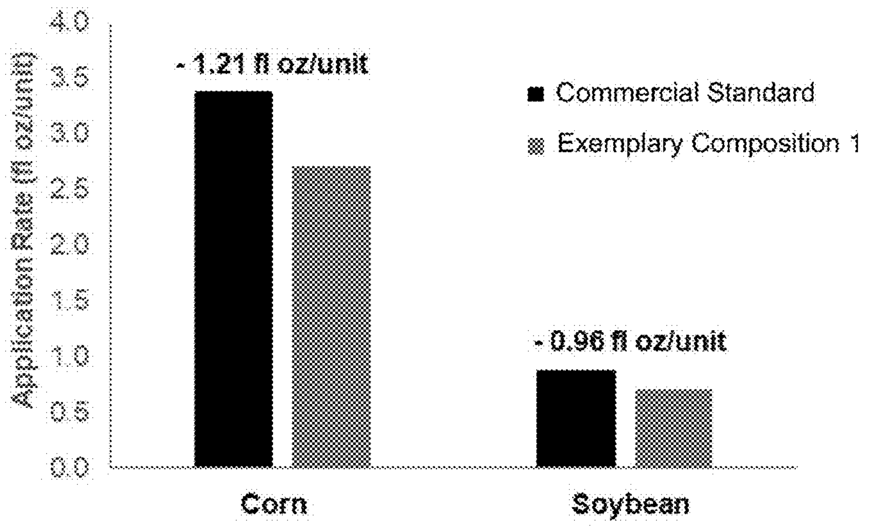
FIG. 3 depicts the reduction in application rate that is achievable with high-load formulations according to the present invention (e.g., 750 g/L) compared to formulations which are commercially available (e.g., 600 g/L). The darker shaded bar represents the application rate of a commercially available, 600 g/L clothianidin formulation (Commercial Standard). The lighter shaded bar represents the application rate of a 750 g/L clothianidin formulation according to the present invention (Exemplary Composition 1).

Yield stress is a better indicator of high-load suspension formulation stability than viscosity. See FIG. 2, which depicts the results of measuring yield stress and viscosity of ten various test formulations. Entry 1 represents a control formulation. Entries 2, 3, 4 and 5 represent formulations having different inorganic rheological modifiers present at a concentration of 0.25 w/w %. Entries 6, 7, 8, 9 and 10 represent formulations having different surfactants present at a concentration of 2 w/w %. As is seen in the top graph, yield stress is improved with rheological modifiers at 0.25 w/w %, as would be expected, and yield stress is improved even more with surfactants at 2 w/w % as would also be expected. However, the viscosity measured (see FIG. 2, bottom) does not clearly correlate with the presence of modifiers.

In an aspect, seed treatment suspension formulations described herein may include any desired effective amount of one or more additional (i.e., second, third, etc.) active ingredients, such as wherein said one or more additional active ingredients is/are present at a combined concentration of 0.001% to 50%, or 0.01% to 33%, or 0.1% to 25% by weight of the formulation.

In an aspect, the disclosure provides for a method of treating a plant or part or seed thereof, or the soil or habitat in which a plant is growing or to be grown, with a formulation according to the present invention.

In an aspect, any plant may be treated according to the present invention.

In another aspect, the seed, plant or part or habitat thereof to be treated with one or more formulations according to the present invention is selected from the group consisting of canola, rapeseed, barley, buckwheat, millet, oats, rye, teosinte, triticale, wheat, corn, rice, sorghum, cotton, soybean, sugarbeet, tomato, bean, carrot, and tobacco.

"Habitat" denotes where a plant or crop is growing or will be grown. The method described herein can be used to treat a desirable plant or crop, or a seed, leaf, part, or habitat thereof. Alternatively, the method described herein can be applied directly to undesired vegetation to be controlled or a habitat thereof.

Formulations of the present invention may be applied to any desirable plant or crop, or a seed, leaf, part, or habitat thereof.

Formulations according to the present invention can be formulated in any desired manner and include any desired excipients.

The product used can be a commercial formulation which contains various formulation additives.

The formulations can be formulated as a seed treatment, foliar composition, a foliar spray, emulsions, suspension, coating formulation, encapsulated formulation, liquid, fertilizer, suspension, or suspension concentrate.

The formulation may be employed alone or in solid, dispersant, or liquid formulation. In yet another aspect, a formulation described herein may be formulated as a tank-mix product.

These formulations are produced in any desired or known manner, for example by mixing the active compounds with extenders, such as liquid solvents, pressurized liquefied gases and/or solid carriers, optionally with the use of surface-active agents, such as emulsifiers and/or dispersants and/or foam formers. If the extender used is water, it is also useful to employ for example organic solvents as cosolvents. Suitable liquid solvents include: aromatics, such as xylene, toluene or alkylnaphthalenes, chlorinated aromatics or chlorinated aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, strongly polar solvents, such as dimethylformamide and dimethyl sulphoxide, and also water. Liquefied gaseous extenders or carriers include those liquids which are gaseous at ambient temperature and at atmospheric pressure, for example aerosol propellants such as halogenated hydrocarbons and also butane, propane, nitrogen and carbon dioxide. As solid carriers there are suitable: for example, ground natural minerals, such as kaolins, clays, talc, chalk, quartz, attapulgite, montmorillonite or diatomaceous earth, and ground synthetic minerals, such as finely divided silica, alumina and silicates. As solid carriers for granules there are suitable: for example, crushed and fractionated natural rocks such as calcite, pumice, marble, sepiolite and dolomite, and also synthetic granules of inorganic and organic meals, and granules of organic material such as sawdust, coconut shells, maize cobs and tobacco stalks. As emulsifiers and/or foam formers there are suitable: for example, non-ionic and anionic emulsifiers, such as polyoxyethylene fatty acid esters, polyoxyethylene fatty alcohol ethers, for example alkylaryl polyglycol ethers, alkylsulphonates, alkyl sulphates, arylsulphonates and protein hydrolysates. As dispersants, for example, lignosulphite waste liquors and methylcellulose are suitable.

Tackifiers such as carboxymethylcellulose and natural and synthetic polymers in the form of powders, granules or latices, such as gum arabic, polyvinyl alcohol and polyvinyl acetate, as well as natural phospholipids, such as cephalins and lecithins, and synthetic phospholipids, can be used in the formulations. Other possible additives are mineral and vegetable oils.

Colorants such as inorganic pigments, for example iron oxide, titanium oxide and Prussian Blue, and organic dyestuffs, such as alizarin dyestuffs, azo dyestuffs and metal phthalocyanine dyestuffs, and trace nutrients such as salts of iron, manganese, boron, copper, cobalt, molybdenum and zinc, can also be used.

A formulation described herein can be applied to a soil, plant or crop, or a seed, leaf, or part thereof in a single application step. In another aspect, a formulation described herein is applied to a soil, a desirable plant or crop, or a seed, leaf, or part thereof in multiple application steps, for example, two, three, four, five or more application steps. In another aspect, the second, third, fourth, or fifth or more application steps may be with the same or different formulations. The methods described herein also provide for an aspect where multiple application steps are excluded.

A formulation described herein can be applied to a soil, desirable plant or crop, or a seed, or part thereof in one or more application intervals of about 30 minutes, about 1 hour, about 2 hours, about 6 hours, about 8 hours, about 12 hours, about 1 day, about 5 days, about 7 days, about 10 days, about 12 days, about 14 days, about 21 days, about 28 days, about 35 days, about 45 days, about 50 days, or about 56 days.

A formulation described herein can be applied to a soil, a desirable plant or crop, or a seed, leaf, or part thereof one or more times during a growing, planting, or harvesting season. In another aspect, a compound or formulation described herein is applied to a desirable plant or crop, seed, or plant part thereof in one, two, three, four, or five or more times during a growing, planting, or harvesting season. In another aspect, a compound or formulation described herein is applied to a plant, crop, seed, or plant part thereof only one time, no more than two times, or no more than three times during a growing, planting, or harvesting season. In yet another aspect, a compound or formulation is applied in a single step to a seed. In yet another aspect, a seed described herein is planted in a one-pass application step.

In an aspect, a formulation of the present invention is applied as a pre-plant treatment, e.g. before a desirable plant or crop is planted.

In another aspect, a formulation of the present invention is applied as a post-plant treatment, e.g. after a desirable plant or crop is planted, or can be applied before and after planting.

In another aspect, the disclosure provides for pre-plant, pre-emergent, and post-emergent application steps or combinations thereof, when applying formulations of the present invention to desirable vegetation, such as ornamental or perennial grasses. In another aspect, a compound or formulation described herein is first applied in a pre-plant step and followed by one or more pre-emergent or post-emergent application steps.

In another aspect, the disclosure provides for pre-emergent and post-emergent, application steps or combinations thereof, when applying formulations of the present invention directly to unwanted vegetation. In another aspect, a compound or formulation described herein is first applied in a pre-emergent step, followed by one or more pre- or post-emergent application steps.

Methods described herein can be used in the treatment of genetically modified organisms (GMOs), e.g., plants or seeds. Genetically modified plants (or transgenic plants) are plants of which a heterologous gene has been stably integrated into the genome. The expression "heterologous gene" essentially means a gene which is provided or assembled outside the plant and when introduced in the nuclear, chloroplastic or mitochondrial genome gives the transformed plant new or improved agronomic or other properties by expressing a protein or polypeptide of interest or by downregulating or silencing other gene(s) which are present in the plant (using for example, antisense technology, cosuppression technology or RNA interference—RNAi—technology). A heterologous gene that is located in the genome is also called a transgene. A transgene that is defined by its particular location in the plant genome is called a transformation or transgenic event.

In an aspect, plants can be obtained by traditional breeding and optimization methods or by bio-technological and recombinant methods, or combinations of these methods, including the transgenic plants and including the plant varieties which are capable or not capable of being protected by Plant Breeders' Rights.

In another aspect, plant species and plant varieties which are found in the wild or which are obtained by traditional biological breeding methods, such as hybridization or protoplast fusion, and parts of these species and varieties are treated. In a further preferred embodiment, transgenic plants and plant varieties which were obtained by recombinant methods, if appropriate in combination with traditional methods (genetically modified organisms) and their parts are treated.

"Plant parts" should be understood as meaning all above ground and subsoil parts and organs of plants, such as shoot, leaf, flower, root, leaves, needles, stalks, stems, fruiting bodies, fruits and seeds, tubers and rhizomes. Plant parts also include harvested crops, and also vegetative and generative propagation material, for example cuttings, tubers, rhizomes, slips and seeds.

Seeds, plant parts, leaves, and plants may be treated via the described method by applying the compounds or formulations directly to the seed, plant part, leaf, or plant. The treated seeds, plants parts, leaves and plants also are provided by the current disclosure.

In certain embodiments, formulations of the invention are utilized as seed treatments. Seeds may be substantially uniformly coated with one or more layers of the formulations disclosed herein using conventional methods of mixing, spraying or a combination thereof through the use of treatment application equipment that is specifically designed and manufactured to accurately, safely, and efficiently apply seed treatment products to seeds. Such equipment uses various types of coating technology, such as rotary coaters, drum coaters, fluidized bed techniques, spouted beds, rotary mists or a combination thereof. Liquid seed treatments such as those of the present invention can be applied via either a spinning "atomizer" disk or a spray nozzle that evenly distributes the seed treatment onto the seed as it moves though the spray pattern. Preferably, the seed is then mixed or tumbled for an additional period of time to achieve additional treatment distribution and dried.

The seeds may be coated via a batch or continuous coating process. In a continuous coating embodiment, continuous flow equipment simultaneously meters both the seed flow and the seed treatment products. A slide gate, cone and orifice, seed wheel, or weighing device (belt or diverter) regulates seed flow. Once the seed flow rate through treating equipment is determined, the flow rate of the seed treatment is calibrated to the seed flow rate in order to deliver the desired dose to the seed as it flows through the seed treating equipment. Additionally, a computer system may monitor the seed input to the coating machine, thereby maintaining a constant flow of the appropriate amount of seed.

In a batch coating embodiment, batch treating equipment weighs out a prescribed amount of seed and places the seed into a closed treating chamber or bowl where the corresponding dose of seed treatment is then applied. This batch is then dumped out of the treating chamber in preparation for the treatment of the next batch. With computer control systems, this batch process is automated enabling it to continuously repeat the batch treating process.

In either embodiment, the seed coating machinery can optionally be operated by a programmable logic controller that allows various equipment to be started and stopped without employee intervention. The components of this system are commercially available through several sources, such as Gustafson Equipment of Shakopee, MN.

In another aspect, the seed, plant part, leaf, or plant may be treated indirectly, for example by treating the environment or habitat in which the seed, plant part, leaf, or plant is exposed to. Conventional treatment methods may be used to treat the environment or habitat including dipping, spraying, fumigating, chemigating, fogging, scattering, brushing on, shanking or injecting.

A compound or formulation described herein can take any of a variety of dosage forms including, without limitation, suspension concentrates, aerosols, capsule suspensions, cold-fogging concentrates, warm-fogging concentrates, encapsulated granules, fine granules, flowable concentrates for the treatment of seed, ready-to-use solutions, dustable powders, emulsifiable concentrates, oil-in-water emulsions, water-in-oil emulsions, macrogranules, microgranules, oil-dispersible powders, oil-miscible flowable concentrates, oil-miscible liquids, foams, pastes, pesticide-coated seed, suspoemulsion concentrates, soluble concentrates, wettable powders, soluble powders, dusts and granules, water-soluble granules or tablets, water-soluble powders for the treatment of seed, wettable powders, natural products and synthetic substances impregnated with a compound or composition described herein, a net impregnated with a compound or composition described herein, and also microencapsulations in polymeric substances and in coating materials for seed, and also ULV cold-fogging and warm-fogging formulations.

In an aspect, a compound or formulation described herein is formulated as a foliar composition, a foliar spray, solutions, emulsions, suspension, coating formulation, non-pesticidal or pesticidal coating formulation, encapsulated formulation, solid, liquid, fertilizer, paste, granule, powder, suspension, or suspension concentrate. In another aspect, a compound or formulation described herein may be employed alone or in solid, dispersant, or liquid formulation. In yet another aspect, a compound or formulation described herein is formulated as a tank-mix product. In another aspect, a compound or formulation described herein is formulated as a soil application formulation, such as a drench formulation or granular spray formulation.

In another aspect, a seed is coated, encapsulated or otherwise covered with one or more formulations described herein.

In another aspect, compounds or formulations described herein can be combined with a fertilizer. Examples of fertilizers capable of being used with the compositions and methods described herein include, for example, Urea, Ammonium Nitrate, Ammonium Sulfate, Calcium Nitrate, Diammonium Phosphate, Monoammonium phosphate, Triple Super Phosphate, Potassium Nitrate, Potassium nitrate, nitrate of potash, Potassium Chloride, muriate of potash, di- and mono-potassiumaiusm salts of phosphite/phosphonate.

In another aspect, the disclosure provides for a fertilizer composition combined with at least one insecticide-containing formulation described herein.

According to the invention, the treatment of plants or crops, and seeds, leaves or parts thereof with a formulation described herein can be carried out directly by the customary treatment methods, for example by immersion, spraying, vaporizing, fogging, injecting, dripping, drenching, broadcasting or painting, and seed treatment.

In an aspect, a composition or method described herein includes an inorganic lubricant composition. In another aspect, a composition or method described herein does not include an inorganic lubricant composition. Inorganic compounds, for example talc and graphite, encompass compounds such as carbides, carbonates, simple oxides of carbon, cyanides, and allotropes of carbon.

In an aspect, a formulation described herein is combined with a talc and/or graphite. In an aspect, a composition or method described herein does not include talc. In another aspect, a formulation or method described herein does not include graphite or graphite blends. In yet another aspect, a formulation or method described herein does not include blends of graphite and/or talc. In another aspect, a formulation or method described herein contains trace amount of talc or graphite. In another aspect, a formulation or method described herein contains less than about 5%, less than about 10%, less than about 20%, less than about 20%, less than about 30%, less than about 40%, or less than about 50% by weight of talc, graphite, or a combination of talc or graphite.

In yet another aspect, a formulation described herein may be blended with inert materials to improve handling or packaging, for example, silica, starches (natural and derived), clays, and other minerals.

In an aspect, a formulation described herein is applied as a powder to a seed at the same time or before the planter fills the planter hopper with seed. In another aspect, a formulation described herein is applied as a dry powder to a seed as a farmer fills the planter hopper with seed.

The following examples serve to illustrate certain aspects of the disclosure and are not intended to limit the disclosure.

EXAMPLES

Example 1: Exemplary High-Load Formulation

Table 1 sets forth an exemplary formulation according to the present invention (Exemplary Composition 1). The formulation set forth in Table 1 was obtained by combining clothianidin with surfactants, antifreeze, biocides, antifoaming agents, and water.

TABLE 1

| | Component | w/w % |
|---|---|---|
| 1 | Active Ingredient (Clothianidin, 100%) | 57.25 |
| 2 | Antifreeze Agent | 7.00 |
| 3 | Surfactant | 4.00 |
| 4 | Surfactant | 0.75 |
| 5 | Surfactant | 0.50 |
| 6 | Anticaking Agent | 0.50 |
| 7 | Biocide/Preservative | 0.18 |
| 8 | Biocide/Preservative | 0.08 |
| 9 | Antifoaming Agent | 0.10 |
| 10 | Xanthan Gum | 0.08 |
| 11 | Water | 29.56 |

Following combination, the mixture of Table 1 was homogenized using an overhead mixer and milled in a beadmill under wet conditions using glass beads having a diameter of from 0.75 mm to 1.0 mm at 2500 rpm for 10 minutes.

Subsequently, a 58.2 w/w % (750 g/L) final mixture was achieved by adding xanthan gum in the form of a 2 w/w % aqueous slurry.

The rheological properties of the samples were then evaluated using a Bohlin Rheometer. The viscosity of each sample was measured at 7.5 $s^{-1}$, 20 $s^{-1}$, and 100 $s^{-1}$.

A shear rate ramp was also performed from 0.001 $s^{-1}$ to 500 $s^{-1}$ and the extrapolated yield stress was obtained from the corresponding plot of yield stress as a function of shear rate.

Example 2: Presence of Glycol

Figure 4:
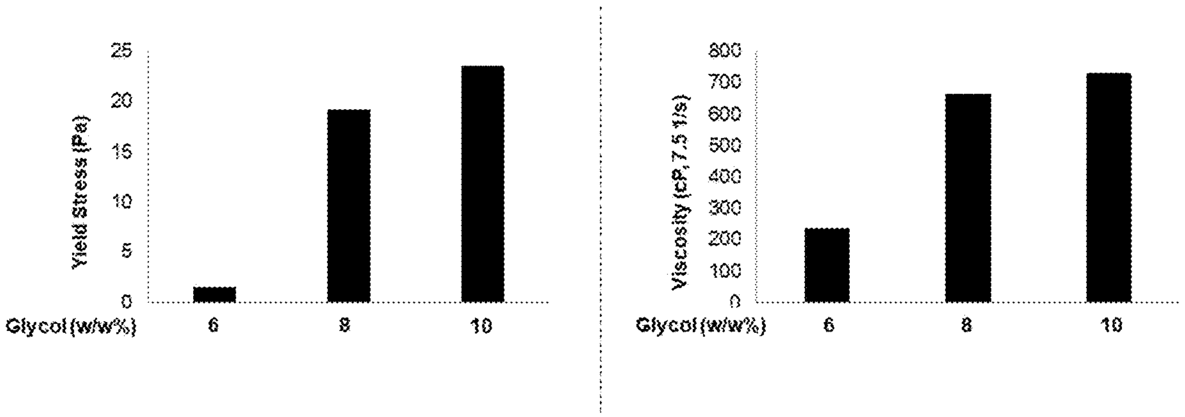
FIG. 4 depicts the relationship between the presence of glycol at various concentrations on both yield stress (left) and viscosity (right).

Yield stress and viscosity were measured for formulations of the present invention with varying glycol concentrations. In particular, formulations comprising 6 w/w % glycol, 8 w/w % glycol, and 10 w/w % glycol were compared. See FIG. 4, which depicts the relationship between the presence of propylene glycol at various concentrations on both yield stress (left) and viscosity (right). As can be seen from FIG. 4, both yield stress and viscosity increased with increasing glycol concentrations.

Figure 5:
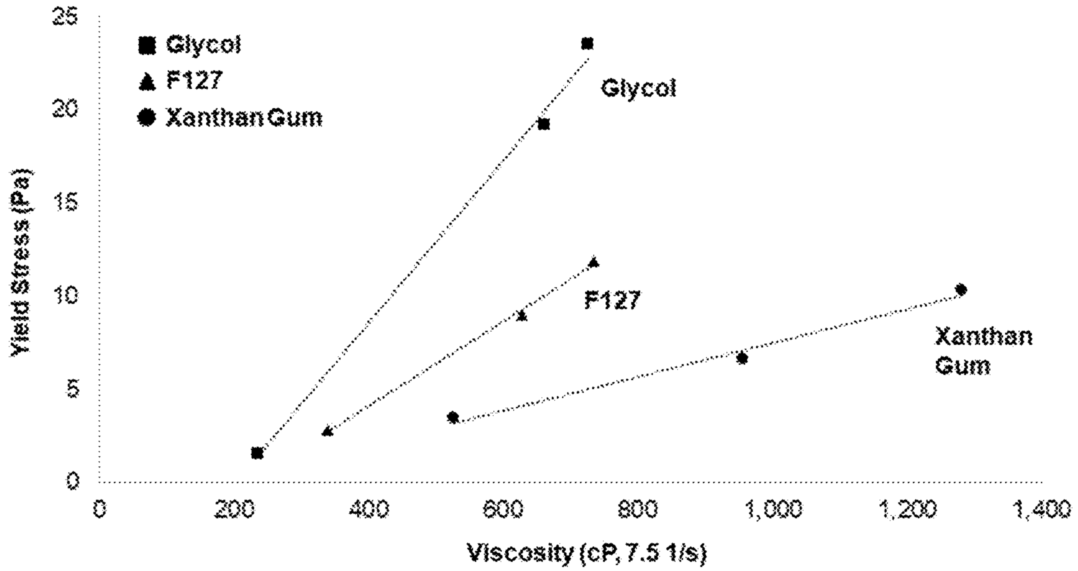
FIG. 5 depicts the relationship between yield stress and viscosity of formulations comprising glycol as compared to the relationship between yield stress and viscosity of formulations comprising Pluronic® F127. In particular, propylene glycol increases yield stress at a much faster rate in relation to viscosity than when compared to Pluronic F127 and xanthan gum. This is significant because, surfactants (e.g., F127) and, more specifically, xanthan gum are traditionally used to increase physical stability by way of increased yield stress. However.

It was further found that, in the target viscosity range of 600-700 cP, addition of glycol yielded a yield stress that was double that of Pluronic® F127. See FIG. 5, which depicts the relationship between yield stress and viscosity of formulations comprising glycol as compared to the relationship between yield stress and viscosity of formulations comprising Pluronic® F127.

Example 3: Glycerin Concentration

The effect of glycerin concentration in formulations of the present invention was additionally tested. In particular, a formulation comprising 10 w/w % glycerin was compared with a formulation comprising 14 w/w % glycerin.

In addition to varying glycerin concentration, less polar cosolvents were also tested. In particular, the wetting agent/dispersant Soprophor 4D/384 was added at 1 w/w % to each of the 10 w/w % glycerin and 14 w/w % glycerin compositions.

When 1 w/w % Soprophor 4D/384 was added to the 10 w/w % glycerin composition, yield stress tripled.

When 1 w/w % Soprophor 4D/384 was added to the 14 w/w % glycerin composition, yield stress increased by a factor of 13.

Accordingly, inclusion of glycerin with a cosolvent dramatically increases yield stress in formulations of the invention, and a positive correlation was observed between glycerin concentration and yield stress. Glycerin thus has the ability to significantly increase yield stress in formulations of the invention.

Example 4: Calcium Chloride Addition

The effect of adding calcium chloride to formulations of the present invention was additionally tested. In particular, the effect of addition of 0.1 w/w % calcium chloride on both yield stress and viscosity of the formulations of the invention was measured.

Figure 6A:
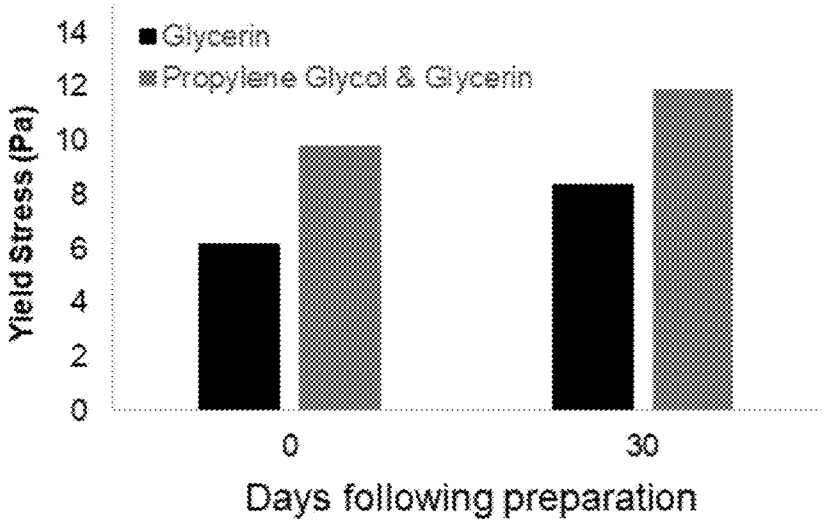
FIG. 6A depicts the relationship between glycerin and yield stress. In particular, glycerin increases yield stress in a different manner than propylene glycol. Over time, high-load formulations develop structure and yield stress increases.
Figure 6B:
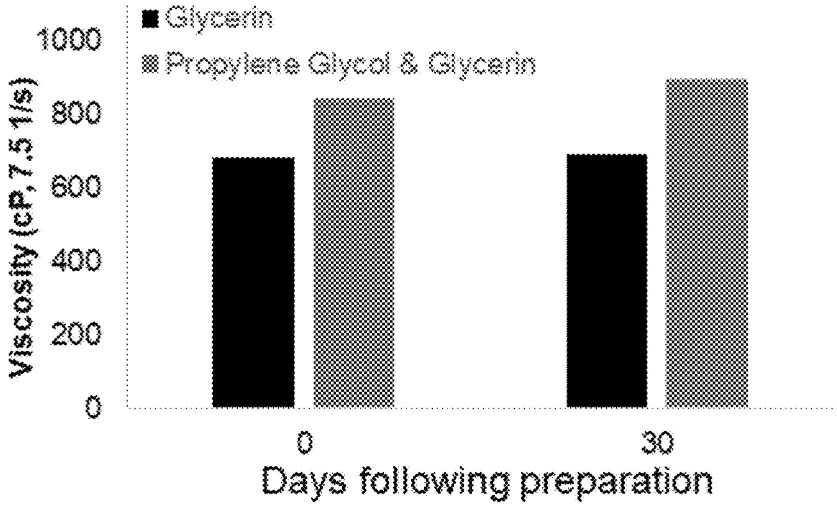
FIG. 6B depicts the relationship between viscosity and the addition of glycerin and/or propylene glycol.

FIG. 6A depicts the relationship between varying calcium chloride addition and yield stress (left) and between calcium chloride addition and viscosity (right).

Example 5: Glycerin+Propylene Glycol

The effect of adding propylene glycol to formulations of the present invention at a concentration equal to that of glycerin was measured over time. As can be seen from FIG. 6A, formulations comprising a 1:1 ratio of glycerin:propylene glycol exhibited substantially greater yield stress than formulations comprising glycerin but not comprising propylene glycol, both initially and after 30 days, thereby indicating greater stability over time.

Example 6: Addition of Xanthan Gum

The effects of adding xanthan gum to formulations of the present invention were measured. A xanthan gum aqueous solution comprising 2 w/w % xanthan gum was added to a formulation of the present invention such that the xanthan gum concentration in the overall composition was 0.04 w/w %.

The first formulations comprising xanthan gum at 0.04 w/w % were compared to formulations comprising xanthan gum at an overall concentration of 0.12 w/w %. The 0.12 w/w % xanthan gum-containing formulations were prepared by adding a 10 w/w % xanthan gum-glycerin solution to formulations of the present invention (as opposed to an aqueous xanthan gum solution of lower concentration).

Figure 7:
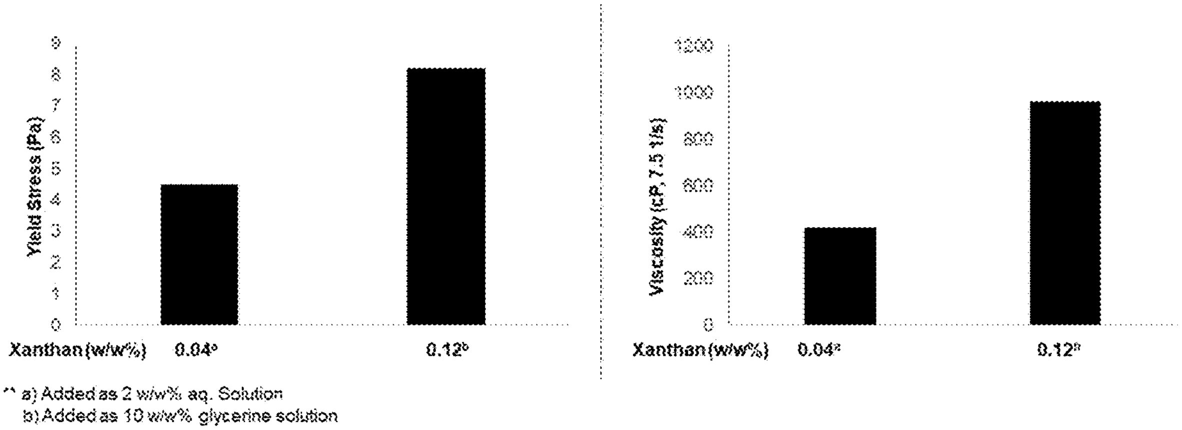
FIG. 7 depicts the effects of adding xanthan gum at various concentrations and in various solutions (i.e., xanthan gum in aqueous solution versus xanthan gum in glycerin solution).

The formulations comprising xanthan gum at 0.12 w/w % (and added via a glycerin solution) exhibited reduced drift in viscosity and significantly greater viscosity than the formulations comprising xanthan gum at 0.04 w/w % (and added via an aqueous solution) (see FIG. 7). The present inventors have found that post-adding xanthan gum in antifreeze (as opposed to water) mitigates drift in viscosity in seed treatment suspension formulations of the present invention over time.

Example 7: Addition of Silica Particles

The effects of adding silica particles to formulations of the present invention were measured. Silica was added at 0.25 w/w % and at 0.50 w/w % to formulations of the present invention.

A positive correlation was observed between silica concentration and both yield stress and viscosity.

The substantial increase in yield stress with increasing silica concentration indicates that addition of silica is a very efficient method of increasing yield stress and stability in formulations.

Example 8: Evaluation of Syneresis

To evaluate syneresis, 100 mL of a 600 g/L clothianidin formulation (Commercial Standard), and a 750 g/L clothianidin formulation according to the present invention (Exemplary Composition 1) was placed in a closed glass vessel and stored under ambient laboratory conditions. At each time point (4, 26, and 52 weeks), the total height of the formulation in the glass vessel was measured as well as the height of the solids layer. Syneresis was calculated using the following equation:

$$\text{Syneresis (\%)} = \frac{(\text{Total height (cm)} - \text{Height of solids layer (cm)})}{\text{Total height (cm)}} \times 100$$

Figure 8:
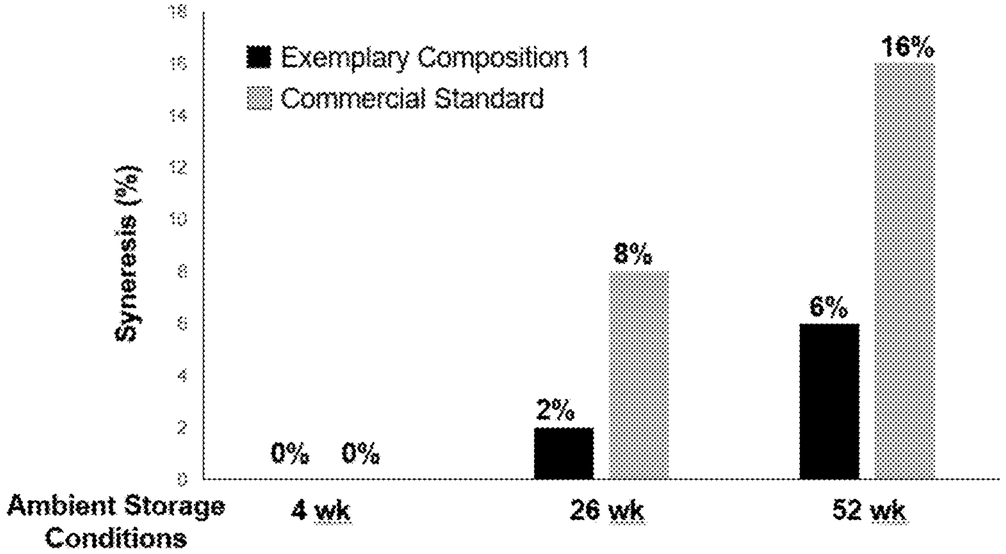
FIG. 8 depicts the syneresis (%) at various time points (4, 26, and 52 weeks) for a 600 g/L clothianidin formulation (Commercial Standard), and a 750 g/L clothianidin formulation according to the present invention (Exemplary Composition 1).

The data (FIG. 8) shows that highly loaded suspension concentrates of 650 g/L or greater can be formulated with exceptional long term physical stability through the addition of antifreeze agents such as glycerin or propylene glycol. In particular, an exemplary composition with 750 g/L clothianidin surprisingly demonstrated a 63% improvement in syneresis over a 600 g/L commercial standard formulation after 1 year of ambient storage. Therefore, the incorporation of antifreeze agents to highly loaded formulations, as described herein, improves the physical stability of formulations and extends the shelf life of agricultural products.

The invention claimed is:

1. A seed treatment formulation comprising:

(a) at least one insecticidal active ingredient present at a concentration of at least 650 g/L; wherein the at least one insecticidal active ingredient is a neonicotinoid, and (b) a glycol and/or glycerin; and wherein said seed treatment formulation exhibits a yield stress of at least 5 Pa, said yield stress being equal to or greater than the yield stress of a formulation comprising less glycol and/or glycerin.

2. The seed treatment formulation of claim 1, wherein said formulation comprises glycerin.

3. The seed treatment formulation of claim 1, wherein said glycol comprises propylene glycol.

4. The seed treatment formulation of claim 1, wherein the formulation comprises glycerin in an amount from about 0.01 w/w % to about 50 w/w %, or from about 0.1 w/w % to about 30 w/w %, from about 0.5 w/w % to about 25 w/w %, from about 1 w/w % to about 20 w/w %, or from about 3 w/w % to about 15 w/w %.

5. The seed treatment formulation of claim 1, wherein the formulation comprises propylene glycol in an amount from about 0.1 w/w % to about 50 w/w %, or from about 0.5 w/w % to about 20 w/w %, about 1 w/w % to about 15 w/w %, or about 3 w/w % to about 10 w/w %.

6. The seed treatment formulation of claim 1, further comprising:

(c) at least one salt, wherein said salt is optionally calcium chloride, and/or (d) silica.

7. The seed treatment formulation of claim 3, wherein propylene glycol and glycerin are present in a ratio propylene glycol to glycerin of about 1:5 to about 5:1.

8. The seed treatment formulation of claim 1, wherein said at least one insecticidal active ingredient is clothianidin, imidacloprid, or a combination thereof.

9. The seed treatment formulation of claim 1, wherein said at least one insecticidal active ingredient is clothianidin, and wherein said clothianidin is present in an amount of about 650 g/L to about 1000 g/L.

10. The seed treatment formulation of claim 1, wherein said formulation further comprises at least one member of the *Bacillus* genus.

11. The seed treatment formulation of claim 10, wherein the at least one member of the *Bacillus* genus is *Bacillus firmus, Bacillus subtilis*, or *Bacillus thuringiensis, Bacillus amyloliquefaciens, Bacillus simplex*, and/or *Bacillus pumilus*.

12. The seed treatment formulation of claim 10, wherein said member of the *Bacillus* genus is present in a concentration of at least $10^9$ cfu/mL.

13. A method of increasing yield stress of a seed treatment formulation comprising adding a glycol and/or glycerin to the seed treatment formulation of claim 1.

14. The method of claim 13, further comprising adding at least one salt and/or silica to the seed treatment formulation.

15. The method of claim 14, wherein said at least one salt is calcium chloride.

16. The method of claim 13, wherein the yield stress of the formulation is improved through the addition of propylene glycol and/or glycerin and that the level of improvement will be proportional to the amount or ratio used.

17. A method for producing an agrochemical formulation comprising:

(a) in a first step, combining at least one insecticidal agent and at least one antifreeze agent; and (b) in a second step, adding to the at least one insecticidal agent and the at least one antifreeze agent a mixture comprising xanthan gum and at least one antifreeze agent.

18. The method of claim 17, wherein the mixture comprising xanthan gum further comprises glycerin.

19. A method of controlling insect pests comprising applying to a plant, plant part, seed, or habitat in which a plant is growing or to be grown a formulation according to claim 1.

* * * * *